Patented Dec. 20, 1949

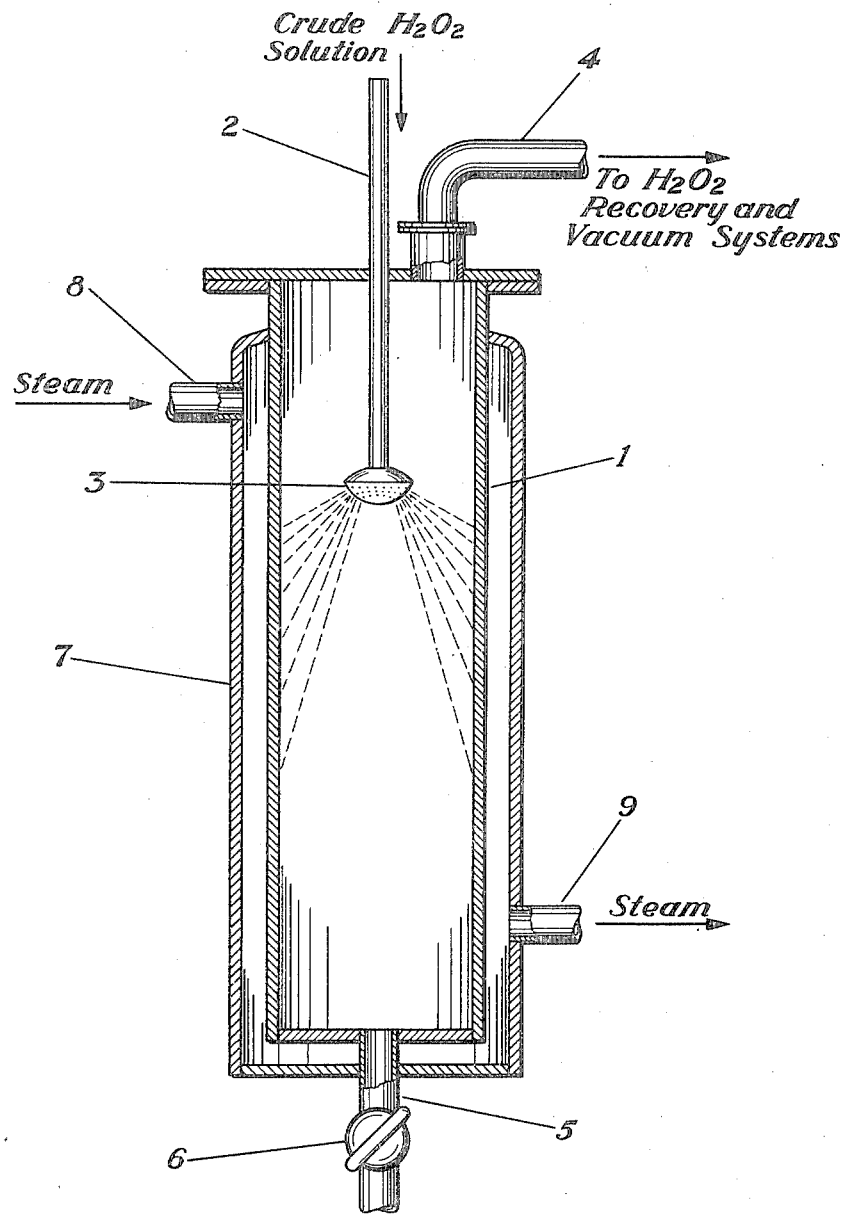

2,491,732

UNITED STATES PATENT OFFICE 2,491,732

METHOD OF VAPORIZING HYDROGEN PEROXIDE

Alfred T. Hawkinson, Niagara Falls, Bruce B. Gralow, Grand Island, and Harold E. May, Niagara Falls, N. Y., assignors to E. I. du Pont de Nemours & Company, Wilmington, Del., a corporation of Delaware Application May 17, 1946, Serial No. 670,546

14 Claims. (Cl. 202—57)

This invention relates to the vaporization of hydrogen peroxide solutions and more particularly to an improved method of effecting vaporization of such solutions employing vaporization equipment constructed of metals having excellent mechanical properties.

Various ways have been proposed heretofore for distilling hydrogen peroxide solutions. One such method involves mass distillation in which solution is contained in a suitably heated boiler, the distillation being stopped when the concentration of solids in the boiling solution makes further vaporization impractical or even hazardous. A modification of this method permits semi-continuous operation but here again residual solutions, containing an appreciable fraction of the total solution to be vaporized, must be rehandled or disposed of otherwise. In a second method, the hydrogen peroxide solutions are vaporized in the form of films applied to an externally heated surface, the vapors being removed either co-current or counter-current to the flow of liquid over the heated surface. Both methods are affected by the well-known susceptibility of hydrogen peroxide to decomposition in the presence of traces of impurities even at ordinary temperatures, which susceptibility is greatly increased at the elevated temperatures necessary for vaporization. The surface through which the heat is supplied to the system is also of primary importance, as it must resist the corrosive action of hydrogen peroxide and must not decompose hydrogen peroxide appreciably. For the above reasons distillation of hydrogen peroxide solutions is generally carried out at sub-atmospheric pressures in inert equipment such as glass or ceramic ware, or using metals which have undesirable mechanical properties. So far as we are aware no practicable method has heretofore been proposed which would permit the efficient use of vaporizers constructed of such metals as stainless steel, nickel and the like which have good mechanical properties.

It is an object of the present invention to provide an improved method for vaporizing hydrogen peroxide solutions. A further object is the provision of a method for vaporizing such solutions whereby rapid vaporization with substantially no decomposition of the hydrogen peroxide may be realized in a practical manner. A still further object is to provide an improved method whereby aqueous hydrogen peroxide solutions may be vaporized with substantially quantitative recovery of the hydrogen peroxide, using equipment constructed of metals such as stainless steel and the like which have excellent mechanical properties. Still further objects will be apparent from the ensuing description of the invention.

The above objects are accomplished in accordance with the invention by contacting the hydrogen peroxide solution which is to be vaporized with the surface of a solid, non-volatile material which is a stabilizer for hydrogen peroxide, at a temperature sufficiently high to effect rapid and complete vaporization of the solution on that surface. The pressure in the vaporization system should, of course, be such as to permit vaporization to occur at the desired rapid rate. Preferably, the vaporization is carried out under reduced pressure, and heat sufficient to effect the rapid vaporization is supplied to the vaporizing surface by means of a heated metallic heat transfer medium, which conveniently may be the wall of the vaporizing vessel, underlying the solid, non-volatile stabilizer from the surface of which vaporization occurs. In other words, the vaporization occurs from the surface of a coating on a heat supplying metallic medium, which coating comprises a substance which is a solid, non-volatile stabilizer for hydrogen peroxide.

In one method of practicing the invention a stainless steel cylindrical vaporizing vessel is utilized. The vessel is provided with an outer jacket through which a heating medium may be circulated, and with a tube extending into the top of the vessel which tube functions to deliver liquid into the vessel in the form of a spray or a plurality of sprays. The delivery end of the tube is so constructed that the liquid is sprayed in finely divided form, e. g. as small droplets, onto the walls of the vaporizer. The vaporizer is connected through an entrainment separator to a condensing system, and the bottom of the vessel is provided with an outlet by means of which liquid employed to clean the vessel may be drained from the system.

In orperation, the system is evacuated so as to maintain a pressure within the vaporizer of about 80 mm. Hg and steam is passed through the heating jacket at about 20 p. s. i. g. To the hydrogen peroxide solution which is to be vaporized, there is added about 0.50 gram per liter of sodium pyrophosphate and the solution is then treated so that neither free acid nor free alkali are present. The treated solution is then delivered to the inside walls of the vaporizer in the form of a fine spray at a rate adjusted so that there is no run-off of liquid from the vertical walls. Under such conditions vaporization occurs substantially instantaneously. As vaporization proceeds, there is formed over the vaporizing area a thin coating of sodium pyrophosphate which increases in thickness with time. Once the coating is formed, vaporization occurs with substantially no decomposition of the hydrogen peroxide so that the weight ratio of hydrogen peroxide to water in the vapors is substantially the same as in the starting solution.

After the area on the vaporizer walls on which vaporization occurs, e. g. the vertical walls, has been satisfactorily coated with the stabilizer, hydrogen peroxide solutions to which no stabilizer has been added may be vaporized from that area with excellent results. However, as a precaution against some of the stabilizer coating flaking off during operation so as to expose bare metal surfaces to direct contact with the liquid being vaporized, it is preferred that the solution being vaporized contain a small amount of stabilizer, e. g. at least 0.2 gram per liter. It will be evident from the foregoing that the objective during the first part of the operation is to provide a coating of a solid, non-volatile stabilizer on those portions of the metal wall on which vaporization will occur. If desired such a coating may be provided by first vaporizing a plain water solution of a stabilizer on the metal surfaces e. g., by spraying such an aqueous solution on the heated walls in the manner described above. Other methods may be used for precoating the surfaces, it being important only that during the vaporization operation proper, the metal heat-transfer surface be covered by a coating of the stabilizer. In actual practice it has been found that an effective coating is formed in a relatively short time if the hydrogen peroxide being vaporized contains in the neighborhood of 0.50 gram per liter of a stabilizer. Once a satisfactory coating has been formed the amount of stabilizer in the feed solution may be reduced, or solution containing no stabilizer may be vaporized with good results. However, as explained above, it is preferred that the feed solution throughout the entire vaporization operation contain at least 0.2 gram per liter of stabilizer even after an effective coating has been formed.

Attached is a diagrammatic illustration of one form of vaporizer which may be used to practice the invention. In the drawing, numeral 1 represents a vertical cylindrical vaporizing vessel which is surrounded by heating jacket 7. Vaporizer 1 is provided with a feed tube 2 bearing a spray nozzle 3 of conventional design at its lower end, a vapor outlet 4 and a drain pipe 5 bearing cock 6. In operation, the walls of vaporizer 1 are heated to the desired temperature by passing a heating fluid such as steam through jacket 7 by way of steam inlet 8 and steam exit 9 while the vaporizer 1 is connected to any suitable hydrogen peroxide recovery and vacuum systems (not shown) by way of vapor outlet 4. When the pressure in the system and the wall temperature of vaporizer 1 are at the desired values, crude solution to be distilled is fed to the inner walls of the vaporizer in the form of a fine spray by way of feed tube 2 and nozzle 3. The nozzle is adjusted so as to deliver liquid in the form of a spray only on the side walls of vaporizer 1 and the rate of delivery is adjusted so that evaporation is complete on the side walls. The distillation is carried out continuously while maintaining pressure and temperature conditions constant at the desired values and while continuously passing resulting vapors to the recovery system. When distilling solution containing a small amount of a non-volatile stabilizer, e. g., sodium pyrophosphate, there soon is formed on the parts of the walls of vaporizer 1 which are contacted with the spray a solid coating of the stabilizer from which the solution is thereafter vaporized. The coating of stabilizer together with the solid non-volatile impurities which are removed by the distillation may after considerable time become sufficiently thick to interfere with efficient heat transfer. At that time, distillation is discontinued and the coating on the walls are flushed free with water and the washings removed by way of drain 5, after which distillation may be resumed. Heating jacket 7 may be made of ordinary steel while for the construction of the remaining parts of the equipment shown stainless steel, e. g., A. I. S. I. type No. 304 or 347, is satisfactory.

The invention is further illustrated by the following examples:

*Example 1*

A stainless steel vaporizer 2 feet in diameter and 5 feet high was secured in a vertical position and connected through a stainless steel entrainment separator with a condenser or product recovery system. The vaporizer was surrounded by a steam jacket by which it was heated and was thoroughly cleaned and washed before use, the cleaning and washing liquids being removed from the bottom by way of an outlet provided for that purpose. The system was evacuated so as to maintain a pressure of 80 mm. Hg in the vaporizer and steam at 20 p. s. i. g. was admitted to the steam jacket. To a crude, unpurified solution of hydrogen peroxide containing 35% by weight of $H_2O_2$ obtained by the hydrolysis of persulphuric acid, there was added 0.50 gram per liter of sodium pyrophosphate. The acidity of the solution was then adjusted to a pH of about 4.3 to 4.5 using a Beckman pH-meter, after which the solution was fed continuously to the inner side walls of the vaporizer in finely divided form. The rate of feed was adjusted so that vaporization occurred substantially instantaneously with no substantial flow of liquid down the walls. Under the conditions of operation, the temperature of the resulting vapors was 50 to 60° C. 100,000 lbs. of the crude 35% solution were vaporized at an average rate of about 330 pounds per hour. The hydogen peroxide recovered in the condenser system represented an active oxygen recovery of 99.4%.

*Example 2*

The crude hydrogen peroxide solution described in Example 1 was treated to adjust its acidity to a pH of about 4.3 to 4.5, but no stabilizer was added. When subjecting this solution to vaporization in the same equipment (after it had been first cleaned and washed) and by the same method described in Example 1, it was found that decomposition of the hydrogen peroxide during vaporization occurred at an excessive rate. Thus, 11 times during a run of 6.5 hours' duration, decomposition was so rapid that it became impossible to maintain the desired vacuum. The decomposition appeared to occur more or less spontaneously, and vigorously at periodic intervals and its occurrence not only resulted in considerable loss of hydrogen peroxide but also made it very difficult to proceed with the operations under anywhere near controlled conditions.

Example 3

Product obtained by the distillation method of Example 1 is very pure and possesses a high degree of stability. Thus, product so obtained and to which no stabilizer has been added loses only about 2–3% of its active oxygen when heated for 24 hours at 100° C. under reflux conditions in laboratory glass equipment. Despite the high stability of such a product, it could not be vaporized as disclosed in Example 1 without substantial loss of hydrogen peroxide resulting when using a freshly cleaned and washed vaporizer. As a matter of fact, vaporization was no more satisfactory than when using the crude, unstabilized solution of Example 2. Thus, in a run using the purified but unstabilized material, decomposition occurred to such an extent that 22 times during 9 hours of operation it was impossible to maintain the desired vacuum in the vaporizer.

Example 4

The run described in Example 2 was repeated using the same crude material except that 0.25 gram per liter of sodium pyrophosphate was added before adjusting the acidity to a pH of 4.3 to 4.5. Vaporization in this instance proceeded smoothly and only once during an 8½ hour period was decomposition sufficiently rapid to render it difficult to maintain the desired vacuum.

Example 5

After carrying out the run described in Example 4, the vaporizing area on the walls of the vaporizer was found to be covered with a coating of sodium pyrophosphate. Without removing that coating the feed was changed to the unstabilized, crude material described in Example 2. Vaporization then proceeded very satisfactorily with substantially quantitative recovery of the hydrogen peroxide in the condensate during a period of 6½ hours.

The results of the above examples show clearly that when vaporization is effected on an uncoated stainless steel surface, substantial decomposition occurs regardless whether the solution being vaporized is crude and unstabilized or is purified and unstablized. The results show equally clearly that either crude or purified solutions may be vaporized effectively with substantially no loss of active oxygen, even though no stabilizer is present in the solution, so long as there is present on the metal surface a coating of the stabilizer.

The above experiments also demonstrate that no appreciable decomposition results from contact of hydrogen peroxide vapors with stainless steel surfaces under the necessary temperature of vaporization. However, we have found that contact of the liquid undergoing vaporization with such surfaces is highly detrimental, as shown by the results of Examples 2 and 3. It is clear, therefore, that in totally vaporizing hydrogen peroxide solutions it is important to prevent contact of the concentrated liquid with stainless steel surfaces and that is accomplished in accordance with our invention by coating those surfaces which would otherwise come into direct contact with the liquid with a non-volatile, solid substance which is a stabilizer for hydrogen peroxide.

Various types of stabilizers may be used successfully in practicing the invention. The stabilizer must, of course, be non-volatile and exist as a solid at the temperature of vaporization. Various organic stabilizers which meet this qualification may be used, however, we prefer to use inorganic stabilizers since they are more stable against decomposition at elevated temperatures and their use avoids the possibility of forming explosive organic peroxides. Many stabilizers that may be used in accordance with the invention are known, examples of which are sodium pyrophosphate and other alkali ortho-, pyro-, and metaphosphates, tin compounds such as sodium stannate, and the like. The quantity of stabilizer that should be employed when that modification of the invention is practiced in which a stabilizer is added to the solution being vaporized, may be varied considerably. In general, quantities of from 0.2 to 1 gram per liter will produce good results, the preferred quantity being 0.3 to 0.6 gram per liter. In some cases it may be advantageous to employ more than 1 gram per liter, although such larger quantities are not generally recommended and may actually be harmful in some instances.

Since hydrogen peroxide is sensitive to heat and tends to decompose more or less rapidly at exceptionally high temperatures it is desirable to effect the vaporization at temperatures as low as possible. For that reason it is advantageous to carry out the vaporization under sub-atmospheric pressure so that, for example, temperatures above 100° C. may be avoided. The vaporization should, therefore, be carried out at such pressures and employing a heating medium at such temperatures as will permit rapid and complete vaporization to yield vapors having a temperature less than about 100° C., and preferably less than 80° C. In general the pressure should be less than 130 mm. Hg. Preferably, the pressure will be less than about 90 mm. Hg. The walls of the vaporizer should be maintained at a temperature sufficiently high to cause rapid and complete vaporization, yet not sufficiently high to heat the resulting vapors substantially above the temperatures indicated. The required heat may be applied to the walls of the vaporizer in any convenient manner, e. g. by means of steam at 0 to 25 p. s. i. g.

While we have illustrated the invention by way of examples using a vaporizer constructed of stainless steel, it is to be understood that other materials of construction may be used satisfactorily. Thus the vaporizer may be constructed of aluminum, tin, nickel and various other metals or alloys which would ordinarily not be satisfactory, but may be satisfactorily used when employing the coating procedure of this invention. We prefer to employ stainless steel of the ordinary variety, for example, A. I. S. I. types Nos. 304 and 347, since outstandingly good results have been obtained using such materials. American Iron and Steel Institute specifications for the above types of steel are:

| Type No. | Percent C | Percent Cr. | Percent Ni | Other elements |
|---|---|---|---|---|
| 304 | 0.08 Max | 18–20 | 8–10 | Mn–2% Max. |
| 347 | 0.10 Max | 17–20 | 8–12 | Cb–10XC. |

The invention is preferably carried out using vaporizing surfaces which are inclined substantially from the horizontal. Best results are obtained employing substantially vertical surfaces such as the side walls of a cylindrically shaped vaporizing vessel. Use of such inclined surfaces insures against the accumulation of concentrated liquid on the vaporizing surfaces. The hydrogen peroxide solution to be vaporized may be delivered to the vaporizing surface in finely divided form, e. g. as a fine spray, or in the form of a thin film. Regardless of the form in which delivery is effected, there should not be any substantial flow of liquid off the vaporizing surface, since otherwise the coating of stabilizer would be removed. Some flow of film probably does occur, and may even be desirable, but such flow should be restricted so that the liquid is completely vaporized on the inclined surface before any dislodgement of the stabilizer coating results. The hydrogen peroxide solution may be sprayed on, for example, the metal side walls by means of any of the various well-known atomizing devices such as a spray nozzle or a rotating disc upon which a stream of the liquid may be fed. Dispersion of the finely divided solution over the maximum area of the side walls is of course desirable since the maximum capacity of the vaporizer may thereby be realized.

The hydrogen peroxide vapors may be withdrawn from any part, e. g. either the top or bottom, of the vaporizer since no accumulation of liquid occurs in any part of the vaporizer. If desired, an inert gas such as air or nitrogen may be passed through the vaporizer to sweep out the vapors and, if dry and heated, such a gas might be used to facilitate vaporization. However, excellent results are obtained without the use of such a gas. The vapors may be passed to any type of recovery system desired and we have found it convenient to interpose an entrainment separator between the vaporizer and the recovery system. Liquid collected in the entrainment separator may of course be fed back to the vaporizer.

The hydrogen peroxide solution to be vaporized should contain no substantial quantity of either a free acid or a free base, i. e. the solution should be substantially at its neutral point. The neutral point for hydrogen peroxide solutions varies with the hydrogen peroxide concentration thereof. When measured electrometrically by means of a Beckman pH meter using a glass electrode and expressing the neutral point in terms of ordinary "pH" values, the neutral points of hydrogen peroxide solutions of 28, 35 and 50% concentrations by weight are approximately 4.3, 3.7 and 2.6, respectively, as compared with a neutral point for water of 7. Thus, the neutral point in terms of "pH" values decreases as the concentration increases, at least in the concentration range indicated. The addition of but a small quantity of either a base or an acid to a hydrogen peroxide solution at its neutral point will result in a marked change in the "pH" value of the solution.

The present process may be used as a means of obtaining hydrogen peroxide solutions which are substantially free of non-volatile impurities, particularly those impurities which though present in small quantities or traces act to catalyze the decomposition of hydrogen peroxide. Although the process may be practiced to separate materials such as salts from hydrogen peroxide solutions in which they are present in substantially larger quantities, it will be realized that when large quantities of impurities are present the coating of solids which will be formed on the evaporating surfaces will tend to build up more rapidly and result in poorer transfer of heat from the metal wall. With such a rapid build up of solid it will be necessary to wash down the walls rather frequently to remove the solids or, alternatively, to remove them by some other means, e. g. by scraping or the like. However, when vaporizing solutions containing only small quantities or traces of impurities, the build up of solids on the metal surfaces occurs at a relatively slow rate and when using solution containing added stabilizers, as in the preferred method of the invention, most of the solids accumulated on the metal surfaces will be the stabilizer. Under such circumstances the removal of solids from the metal surfaces need not be carried out very often and removal by washing with water is generally effective.

The invention is primarily concerned with a method of purification by vaporization but of course it may be practiced as a method of concentrating hydrogen peroxide solutions since solutions more concentrated than the starting solution may be readily obtained by various well-known ways such as by fractional condensation of the vapors or by absorption methods.

Various modifications may be made in the details set forth above without departing from the spirit and scope of the invention. Accordingly, it is to be understood that the invention is not limited to those details except as indicated in the appended claims.

We claim:

1. A method of vaporizing hydrogen peroxide solutions comprising contacting a hydrogen peroxide solution with a heated surface inclined from the horizontal under such conditions that said solution is vaporized rapidly and completely on said surface without accumulation of liquid thereon to yield vapors having a weight ratio of hydrogen peroxide to solvent which is substantially the same as the weight ratio of hydrogen peroxide to solvent in the starting solution, said surface comprising a coating of a solid, non-volatile hydrogen peroxide stabilizer on an underlying heat-supplying surface.

2. A method of vaporizing hydrogen peroxide solutions comprising coating a heat-supplying metal surface with a substance comprising a solid, non-volatile hydrogen peroxide stabilizer and contacting a hydrogen peroxide solution with said coating while said coating is positioned so as to incline from the horizontal and under such conditions that said solution is vaporized rapidly and completely on said inclined coating without accumulation of liquid thereon to yield vapors having a weight ratio of hydrogen peroxide to solvent which is substantially the same as weight ratio of hydrogen peroxide to solvent in the starting solution.

3. A method of vaporizing hydrogen peroxide solutions comprising coating a heat-supplying metallic surface with a substance comprising a solid, non-volatile hydrogen peroxide stabilizer, continuously feeding an aqueous hydrogen peroxide solution in finely divided form to said coating in a closed vessel while said coating is positioned to incline from the horizontal and under such conditions that said hydrogen peroxide solution is vaporized rapidly and completely on said inclined coating without accumulation of liquid thereon to yield vapors having a weight ratio of hydrogen peroxide to water which is substantially the same as the weight ratio of hydrogen peroxide to water in the starting solution and continuously withdrawing said vapors from said vessel.

4. A method of vaporizing hydrogen peroxide solutions comprising continuously feeding an aqueous hydrogen peroxide solution in finely divided form to the inner walls of a closed metal vessel, adjusting the rate of feed of said solution to said walls, the pressure within said vessel and the temperature of said walls so that vaporization occurs rapidly and completely on said walls to yield vapors having a temperature not exceeding 100° C. and a weight ratio of hydrogen peroxide to water which is substantially the same as the weight ratio of hydrogen peroxide to water in the starting solution, said hydrogen peroxide solution containing a solid, non-volatile hydrogen peroxide stabilizer in an amount which causes the formation of a coating of said stabilizer on said surface during the vaporization.

5. A method of vaporizing hydrogen peroxide solutions comprising feeding an aqueous solution containing a solid, non-volatile hydrogen peroxide stabilizer in finely divided form to a heated metal surface inclined from the horizontal in an enclosed vessel so as to vaporize said solution and provide a coating comprising said stabilizer on said surface, continuously feeding an aqueous solution of hydrogen peroxide to said coating while maintaining the pressure within said vessel at less than 130 mm. Hg and while heating said metal surface so as to effect rapid and complete vaporization of said hydrogen peroxide solution from said coating without accumulation of liquid thereon to yield vapors having a temperature less than 100° C. and a weight ratio of hydrogen peroxide to water substantially the same as the weight ratio of hydrogen peroxide to water in said hydrogen peroxide solution.

6. A method of vaporizing hydrogen peroxide solutions comprising continuously feeding in finely divided form an aqueous hydrogen peroxide solution to the inner walls of a metal vessel while maintaining the pressure within said vessel at less than 130 mm. Hg and the temperature of said walls sufficiently high to effect rapid and complete vaporization of said solution on said walls, said solution containing 0.2 to 1 gram per liter of a solid, non-volatile inorganic substance which is a stabilizer for hydrogen peroxide.

7. A method of vaporizing hydrogen peroxide solutions comprising continuously feeding in finely divided form an aqueous hydrogen peroxide solution to the inner walls of a stainless steel vessel while maintaining the pressure within said vessel at less than 130 mm. Hg and the temperature of said walls sufficiently high to effect rapid and complete vaporization of said solution on said walls, said solution containing 0.2 to 1 gram per liter of a solid, non-volatile inorganic substance which is a stabilizer for hydrogen peroxide.

8. A method of vaporizing hydrogen peroxide solutions comprising continuously feeding in finely divided form an aqueous hydrogen peroxide solution to the inner walls of a stainless steel vessel while maintaining the pressure within said vessel less than 130 mm. Hg and the temperature of said walls sufficiently high to effect rapid and complete vaporization of said solution on said walls, said solution containing 0.3 to 0.6 gram per liter of a solid, non-volatile inorganic substance which is a stabilizer for hydrogen peroxide.

9. A method of vaporizing hydrogen peroxide solutions comprising continuously feeding in finely divided form an aqueous hydrogen peroxide solution containing 0.2 to 1 gram per liter of an alkali metal phosphate to the inner walls of a stainless steel vessel while maintaining the pressure within said vessel at less than 130 mm. Hg and the temperature of said walls sufficiently high to effect rapid and complete vaporization of said solution on said walls.

10. A method of vaporizing hydrogen peroxide solutions comprising continuously feeding in finely divided form an aqueous hydrogen peroxide solution containing 0.2 to 1 gram per liter of sodium pyrophosphate to the inner walls of a stainless steel vessel while maintaining the pressure within said vessel at less than 130 mm. Hg. and the temperature of said walls sufficiently high to effect rapid and complete vaporization of said solution on said walls.

11. A method of vaporizing hydrogen peroxide solutions comprising continuously feeding in finely divided form an aqueous hydrogen peroxide solution containing 0.3 to 0.6 gram per liter of sodium pyrophosphate to the inner walls of a stainless steel vessel while maintaining the pressure within said vessel at less than 130 mm. Hg. and the temperature of said walls sufficiently high to effect rapid and complete vaporization of said solution on said walls.

12. A method of vaporizing hydrogen peroxide solutions comprising continuously feeding in finely divided form an aqueous hydrogen peroxide solution containing 0.3 to 0.6 gram per liter of sodium pyrophosphate to the inner walls of a stainless steel vessel while maintaining the pressure within said vessel less than 90 mm. Hg and the temperature of said walls sufficiently high to effect rapid and complete vaporization of said solution on said walls.

13. A method of vaporizing hydrogen peroxide solutions comprising continuously feeding in finely divided form an aqueous hydrogen peroxide solution to the inner walls of a metal vessel while maintaining the pressure within said vessel at less than 130 mm. Hg and the temperature of said walls sufficiently high to effect rapid and complete vaporization of said solution on said walls, said solution containing 0.2 to 1 gram per liter of a tin compound which is a stabilizer for hydrogen peroxide.

14. A method of vaporizing hydrogen peroxide solutions comprising continuously feeding in finely divided form an aqueous hydrogen peroxide solution to the inner walls of a stainless steel vessel while maintaining the pressure within said vessel at less than 130 mm. Hg and the temperature of said walls sufficiently high to effect rapid and complete vaporization of said solution on said walls, said solution containing 0.2 to 1 gram per liter of a tin compound which is a stabilizer for hydrogen peroxide.

ALFRED T. HAWKINSON.
BRUCE B. GRALOW.
HAROLD E. MAY.

REFERENCES CITED

The following references are of record in the file of this patent:

UNITED STATES PATENTS

| Number | Name | Date |
|---|---|---|
| 1,013,791 | Lowenstein | Jan. 2, 1912 |
| 1,213,921 | Liebknecht et al. | Jan. 30, 1917 |
| 1,323,075 | Leuin et al. | Nov. 25, 1919 |
| 1,851,961 | Lowenstein | Mar. 29, 1932 |
| 1,854,327 | Baum | Apr. 19, 1932 |
| 2,242,466 | Greenewalt et al. | May 20, 1941 |
| 2,298,064 | MacMullin | Oct. 6, 1942 |
| 2,336,493 | Marks | Dec. 14, 1943 |
| 2,368,806 | Cook | Feb. 6, 1945 |